US010698619B1

(12) United States Patent
Helman et al.

(10) Patent No.: US 10,698,619 B1
(45) Date of Patent: Jun. 30, 2020

(54) SERVICE LEVEL AGREEMENT BASED MANAGEMENT OF PENDING ACCESS REQUESTS

(71) Applicant: Infinidat LTD., Herzliya (IL)

(72) Inventors: Haim Helman, Los Gatos, CA (US); Qun Fan, Irvine, CA (US); Venu Nayar, San Jose, CA (US)

(73) Assignee: INFINIDAT LTD., Herzliya (IL)

( * ) Notice: Subject to any disclaimer, the term of this patent is extended or adjusted under 35 U.S.C. 154(b) by 208 days.

(21) Appl. No.: 15/249,500

(22) Filed: Aug. 29, 2016

(51) Int. Cl.
*G06F 3/06* (2006.01)

(52) U.S. Cl.
CPC ............ *G06F 3/0631* (2013.01); *G06F 3/067* (2013.01); *G06F 3/0611* (2013.01); *G06F 3/0659* (2013.01)

(58) Field of Classification Search
CPC ................................ G06F 3/0631; G06F 3/067
See application file for complete search history.

(56) References Cited

U.S. PATENT DOCUMENTS

| | | | | |
|---|---|---|---|---|
| 7,669,026 | B2* | 2/2010 | Boss ..................... | G06F 3/0605 711/165 |
| 2003/0135609 | A1* | 7/2003 | Carlson ................. | G06F 9/5011 709/224 |
| 2004/0139191 | A1* | 7/2004 | Chambliss ............ | G06F 3/0617 709/224 |
| 2009/0259752 | A1* | 10/2009 | McNutt ............... | H04L 67/1097 709/225 |
| 2010/0262695 | A1* | 10/2010 | Mays .................... | G06F 9/5027 709/226 |
| 2013/0135993 | A1* | 5/2013 | Morrill ............... | H04L 12/6418 370/228 |
| 2016/0275915 | A1* | 9/2016 | Smyth .................... | G06T 13/80 |
| 2017/0242729 | A1* | 8/2017 | Chen .......................... | G06F 9/50 |
| 2017/0255500 | A1* | 9/2017 | Carnevale ............. | G06F 9/4881 |

* cited by examiner

*Primary Examiner* — Charles Rones
*Assistant Examiner* — Tian-Pong Chang
(74) *Attorney, Agent, or Firm* — Oren Reches

(57) ABSTRACT

A method for service level agreement allocation of permanent storage layer resources of a storage system, the method may include monitoring, by a control layer of the storage system, actual performances of the storage system that are related to multiple logical volumes; calculating actual-to-required relationships between the actual performances and service level agreement defined performances of the multiple logical volumes; allocating, for different logical volumes of the multiple logical volumes, allowable amounts of pending access requests; wherein the allocating is based on, at least, the actual-to-required relationships; receiving, by the control layer, received access requests aimed to one or more logical volumes of the logical volumes; and sending to the permanent storage layer requests to serve at least some of the received access requests, based on the allowable amounts of pending access requests.

16 Claims, 3 Drawing Sheets

```
┌─────────────────────────────────────────────────────────────────────┐
│ Increasing an allowable amount of pending access requests associated with an │ ◄ ─┐
│    underperforming logical volume of the multiple volumes. 131      │    │
└─────────────────────────────────────────────────────────────────────┘    │
                                                                            │
┌─────────────────────────────────────────────────────────────────────┐    │
│ Reducing an amount of pending access requests associated with an over-│    │
│    performing logical volume of the multiple volumes. 132           │    │
└─────────────────────────────────────────────────────────────────────┘    │
                                                                            │
┌─────────────────────────────────────────────────────────────────────┐    │
│ Allocating based on the actual-to-required relationships and based on pervious│  │
│    actual performances of the storage system related to the multiple logical │  │
│                         volumes. 133                                │    │
└─────────────────────────────────────────────────────────────────────┘    │
                                                       More effective to   │
                                                            increase       │
┌─────────────────────────────────────────────────────────────────────┐    │
│ Calculating an effectiveness of an increment in an amount of pending access │─ ─┘
│   requests associated with a given under-performing logical volume. 134 │
└─────────────────────────────────────────────────────────────────────┘
                          │  More effective to
                          │      decrease
                          ▼
┌─────────────────────────────────────────────────────────────────────┐
│ Decreasing an amount of pending access requests associated with an over-│
│ performing logical volume instead of increasing an amount of pending access│
│   requests associated with an under-performing logical volume. 135  │
└─────────────────────────────────────────────────────────────────────┘

┌─────────────────────────────────────────────────────────────────────┐
│ Allocating based on the actual-to-required relationships and based on previously│
│         allocated allowable amounts of access requests. 136          │
└─────────────────────────────────────────────────────────────────────┘

┌─────────────────────────────────────────────────────────────────────┐
│ Assigning scores to the multiple logical volumes scores. The scores are based on│
│  the actual-to-required relationships. The allowable amounts of pending access│
│              requests are based on the scores. 137                   │
└─────────────────────────────────────────────────────────────────────┘

┌─────────────────────────────────────────────────────────────────────┐
│ Assigning the allowable amounts of pending access requests based on the scores│
│ and on previously allocated allowable amounts of pending access requests. 138│
└─────────────────────────────────────────────────────────────────────┘
```

SERVICE LEVEL AGREEMENT BASED MANAGEMENT OF PENDING ACCESS REQUESTS

BACKGROUND

A service-level agreement (SLA) between a storage system and a storage user (user) defines the quality of service (QoS) that is guaranteed to logical volumes associated with the storage user and particularity defines the performance, such as: response time, number of IO operations per second (IOPS), and throughput (megabytes per second).

Various logical volumes of a storage system may be assigned with different SLAs and thus different required performance. Usually, the various logical volumes share the same system resources, such as physical disk drives. Physical disk drives handle their own internal queues that are handled in a FIFO manner, without awareness of priorities dictated by the upper layers of the storage system, such as priorities that should be enforced due to guaranteed quality of service.

There is a need to share the disk drives resource among logical volumes, in a manner that reflects the required performance defined in the SLA of the logical volumes.

SUMMARY

There may be provided a method for service level agreement allocation of permanent storage layer resources of a storage system, the method may include monitoring, by a control layer of the storage system, actual performances of the storage system that may be related to multiple logical volumes; calculating actual-to-required relationships between the actual performances and service level agreement defined performances of the multiple logical volumes; allocating, for different logical volumes of the multiple logical volumes, allowable amounts of pending access requests; wherein the allocating may be based on, at least, the actual-to-required relationships; receiving, by the control layer, received access requests aimed to one or more logical volumes of the logical volumes; and sending to the permanent storage layer requests to serve at least some of the received access requests, based on the allowable amounts of pending access requests.

The method may include delaying, when an allowable amount of pending access requests related to a given logical volume was reached, a sending of a request to serve, by the permanent storage layer, an access request associated with the given logical volume.

The allocating may include increasing an allowable amount of pending access requests associated with an under-performing logical volume of the multiple logical volumes.

The allocating may include reducing an allowable amount of pending access requests associated with an over-performing logical volume of the multiple logical volumes.

The allocating may be also based on pervious actual performances of the storage system related to the multiple logical volumes.

The allocating may include decreasing an allowable amount of pending access requests associated with an over-performing logical volume instead of increasing an allowable amount of pending access requests associated with an under-performing logical volume.

The method may include calculating an effectiveness of an increment in an amount of pending access requests associated with a given under-performing logical volume.

The calculating of the effectiveness may be based upon history related to the given under-performing logical volume.

The allocating may also be based on previously allocated allowable amounts of access requests.

The calculating of the allowable amounts of pending access requests may include assigning scores to the multiple logical volumes scores; wherein the scores may be based on the actual-to-required relationships; and wherein the allowable amounts of pending access requests may be based on the scores.

Higher scores may be associated with higher allowable amounts of pending access requests and may be associated with lower actual-to-required-relationships.

The allowable amounts of pending access requests may be based on the scores and on previously allocated allowable amounts of pending access requests.

The method may include re-allocating at least one allowable amount of pending access requests when one or more actual-to-required relationship has changed.

The control layer may be prevented from directly defining resource allocations of resources of the permanent storage layer. The permanent storage layer may be configured to reject or ignore direct definitions from the control layer and/or the protocol between the control layer and the permanent storage layer may not define the passage of direct controls between said layers.

The actual-to-required relationship of a given logical volume may be a ratio between an actual performance of the storage system that may be related to the given logical volume and an SLA defined performance of the storage system that may be related to the given logical volume.

A storage system may include a control layer and a permanent storage layer; wherein the control layer may be configured to monitoring actual performances of the storage system that may be related to multiple logical volumes; calculate actual-to-required relationships between the actual performances and service level agreement defined performances of the multiple logical volumes; allocate, for different logical volumes of the multiple logical volumes, allowable amounts of pending access requests; wherein the allocating may be based on, at least, the actual-to-required relationships; receive received access requests aimed to one or more logical volumes of the logical volumes; and send to the permanent storage layer requests to serve at least some of the received access requests, based on the allowable amounts of pending access requests.

A non-transitory computer readable medium that stores instructions that once executed by a control layer of a storage system, causes the control layer to execute the steps of monitoring, by a control layer of the storage system, actual performances of the storage system that may be related to multiple logical volumes; calculating actual-to-required relationships between the actual performances and service level agreement defined performances of the multiple logical volumes; allocating, for different logical volumes of the multiple logical volumes, allowable amounts of pending access requests; wherein the allocating may be based on, at least, the actual-to-required relationships; receiving, by the control layer, received access requests aimed to one or more logical volumes of the logical volumes; and sending to the permanent storage layer requests to serve at least some of the received access requests, based on the allowable amounts of pending access requests.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates various steps of the method of FIG. 2 according to an embodiment of the invention.

DETAILED DESCRIPTION OF THE DRAWINGS

Figure 1:
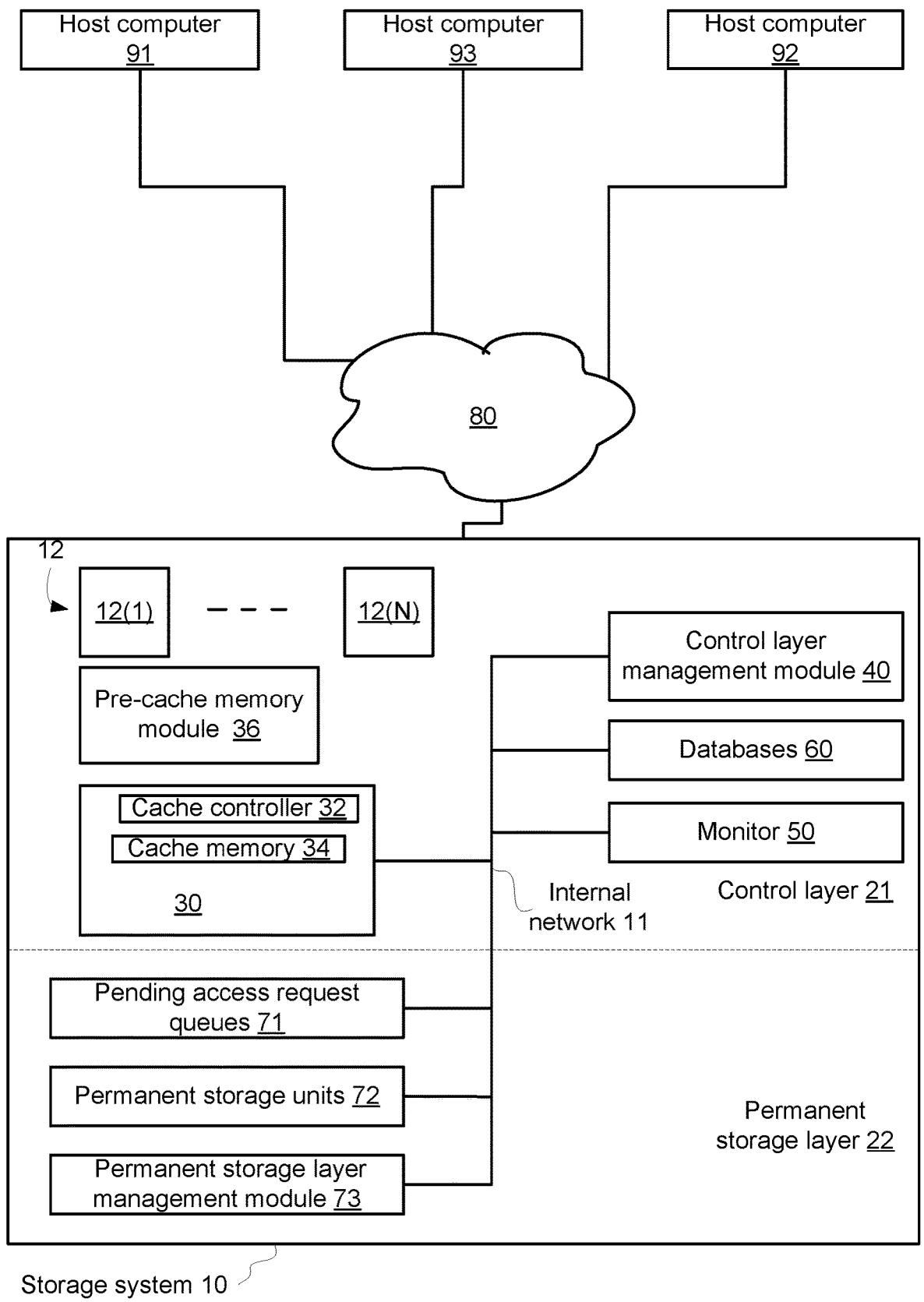
FIG. 1 illustrates a storage system, a network and multiple host computers according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following system, method and non-transitory computer readable medium monitor the actual performance of the storage system with regard to various logical volumes and uses the relation between the actual performance and the required performance as was defined in the SLA of the various volumes as a priority for using system resources. The actual-to-required performance relation dictates the priorities of the various volumes with regard to using the physical storage (e.g., disks) that is shared among the various volumes.

The term "data unit" may include multiple bits related to a user. The multiple bits may be an atomic unit for any operation such as caching, de-staging, read and/or write operations or may differ from such an atomic unit. The term user data may refer to one or more user data units.

FIG. 1 illustrates storage system 10 according to an embodiment of the invention.

Storage system 10 may be a mass storage system that may store more than 10, 50, 100, 150, 200, 500, 1000 and even more terabytes.

Storage system 10 may be accessed by multiple computerized systems such as host computers 91, 92 and 93 that are coupled to storage system 10 over network 80. The computerized systems 91, 92 and 93 can read data from the storage system 10 and/or write data to the storage system 10.

Host computers 91, 92 and 93 may host multiple applications. Any number of computerized systems may be coupled to storage system 10 and any computerized system may host any number of applications.

Storage system 10 includes a control layer 21 and a permanent storage layer 22. Internal network 11 may couple different components of these layers to each other.

Permanent storage layer 22 is used to store data for any periods of time—including very long periods of time (days, months, years and the like). Control layer 21 may receive access requests from the host computers, cache write requests and manage the access to the permanent storage layer 22.

Control layer 21 includes control layer management module 40, databases 60, monitor 50 and cache module 30.

Databases 60 may store metadata such as the SLA per each logical volume, actual-to-required relationships per logical volume, allowable amounts of pending access requests, history related to the logical volumes (pervious actual-to-required relationships per logical volume, pervious amounts of pending access requests, and the like.

Control layer management module 40 may include one or more processors and/or may be hosted by one or more processors. The control layer management module 40 may include at least one hardware component. The control layer management module 40 is configured to control accesses to permanent storage layer 22.

The cache module 30 may include cache controller 32, cache memory 34. Cache module 30 may be preceded by pre-cache memory module 36. Pre-cache memory module 36 may store data units that were received when cache memory 34 was not able to receive that data (for example—cache memory 34 was full), and this data is eventually sent to cache memory 34 when cache memory 34 is not full.

Cache memory 34 can be used to temporarily store data received from computerized systems 91, 92 and 93 before the data is de-staged to permanent storage layer 22 and for storing data that was read from permanent storage layer 22 and particularly, the most used data.

Internal network 11 facilitates communications between one or more components of permanent storage layer 22 and control layer 21. Internal network 11 may include passive and active components such as communication links, connectors, switches, routers and the like.

It is assumed that data units are stored in permanent storage layer 22, part of the data is stored in both permanent storage layer 22 and control layer 21 and some data is stored in control layer 21 and not stored in permanent storage layer (for example—dirty data that is temporally stored in cache memory 34. Cache memory 34 provides a faster access time and lower latency comparing to the access time and latency provided by the storage devices of permanent storage layer 22. Cache memory 34 may be a RAM or SSD.

Control layer 21 may include monitor 50 and data bases 60. Monitor 50 is configured to monitor the performances of the storage system 10—especially monitor the performance of the storage system regarding multiple logical volumes 12(1)-12(N)—collectively denoted 12.

Multiple logical volumes 12(1)-12(N) are virtual address spaces. One or more of these logical volumes are exposed to one or more of host computers 91, 92 and 93. Different host computers may be exposed to the same or different logical volumes. The term "exposed" means that a host computer may send access requests with logical addresses that are located within the logical volumes exposed to that host computer. Storage system 10 may perform one or more conversions of the virtual addresses and eventually stores data units in physical addresses of the permanent storage layer 22.

Permanent storage layer 22 includes pending access request queues 71, permanent storage units 72 and permanent storage layer management module 73.

Permanent storage units 72 may include one or more disks, one or more solid state drivers (SSDs) or any non-volatile storage units.

Pending access request queue 71 may store pending access requests that are sent to permanent storage layer 22 from control layer 21.

Permanent storage layer management module 73 controls the operation of permanent storage layer 22. Control layer 21 may be prevented from directly affecting the manner in which the permanent storage layer 22 is controlled—but may indirectly affect the manner that the permanent storage layer 22—by controlling the access requests that are sent from control layer 21 to permanent storage layer 22.

Control layer management module 40 and monitor 50 may perform various steps of various methods illustrated in the patent application. It is noted that the various methods may be executed by a controller that differs from control layer management module 40 and that the controller may belong to storage system 10 or not belong to the storage system 10. For example—the monitoring of the actual performance of the volumes and calculating the actual-to-required performance of the volumes may be executed by the monitor 50 and/or control layer management module 40 while the decisions relating to transferring access requests towards the permanent storage layer can be made by a different controller.

Various logical volumes of the storage system can be associated with SLAs that define the required performance as defined by an administrator of the storage system for the sake of a user of the system. The user may be a host computer, an application or any other program hosted by the host computer, and the like.

The required performance can be for example: minimum IOPS, minimum throughput, maximum response time, etc. The storage system may provide more than the minimum defined IOPS or throughput when the resources allow it. But when the resources are substantially loaded, providing more IOPS than required to a certain logical volume may result in violation of the SLA of another logical volume.

The actual performance is being monitored per logical volume repetitively, periodically or upon certain events (e.g., upon completing serving a bunch of access requests).

The actual performance is compared to the required performance of the logical volume, so as to provide actual-to-required performance relationship (will be also referred to as 'normalized performance'), which may be the division of the two (<actual performance>:<required performance>), a normalized difference ((<actual performance>-<required performance>)/ <required performance>), or any other expression that represents the gap between the required performance and the actual performance.

The actual-to-required performance relationship dictates the current priority of the logical volume and the share of resources that will be dedicated for serving access requests directed towards the logical volume. When the actual performance is much higher than the required performance, the priority is considered as low, and when the actual performance is much lower than the required performance, the priority is considered as high. The extent of the gap between the actual performance and the required performance can also influent the priority, so as to define multiple intermediate priorities.

An over-performing logical volume is a logical volume that performs better than the performance defined in the SLA and probably receives more resources than needed for conforming to the SLA. An under-performing logical volume is a logical volume that performs worse than the performance defined in the SLA and probably receives too low resources that does not allow it to conform to the SLA.

The actual-to-required performance relationships may change over time—and the tagging of logical volumes as over-performing or under-performing also changes over time.

According to embodiments of the present invention, the allowed number of pending access requests (Access requests waiting for response from the physical storage layer) per logical volume is limited and determined at least according to the current normalized performance of the logical volume. Since the permanent storage layer serves all the logical volumes, when determining the number of pending access requests for a certain logical volume, the normalized performance of other logical volumes also influences the allowed number of pending access requests of the certain logical volume.

The following non-limiting example illustrates a simple example of how the allowed pending access requests can be determined based on the normalized performance.

|  | V1 | V2 | V3 | V4 | V5 | Sum |
|---|---|---|---|---|---|---|
| actual-to-required performance relationship (NP) | 2 | 0.5 | 1 | 0.75 | 0.25 | 4.5 |
| Score for pending Access requests | 1 | 7 | 5 | 6 | 8 | 27 |
| Relative score | 1/27 | 7/27 | 5/27 | 6/27 | 8/27 |  |
| Allowed pending access requests on pending access request queues | 37 | 259 | 185 | 222 | 296 |  |

Suppose there are five logical volumes, V1-V5, whose normalized performance is being monitored. In this example the normalized performance is calculated as the actual performance divided by the required performance. Logical volume V1 over-performs twice above the required performance, logical volume V2 underperforms with a performance that is only half of the required performance, logical volume V3 performs as required, logical volume V4 performance is only 75% of the required performance, and logical volume V5 performance is only 25% of the required performance.

The logical volumes are scored (prioritized) according to the gap between the actual performance and the required performance, so that the logical volume with the lowest normalized performance is associated with the highest score (or priority) among all other logical volumes and the logical volume with the highest normalized performance is associated with the lowest score among all other logical volumes. In this example: logical volume V1 is the logical volume with the highest normalized performance, so it is being associated with the lowest score of '1', while logical volume v5 is the logical volume with the lowest normalized performance, so it is being associated with the highest score of '8'.

All other logical volumes, with intermediate normalized performance, have corresponding intermediate scores. The extent of the gap between the actual and required performance may be weighted into the score. In this example, instead of rating the five logical volumes with score values of 1 to 5, the scores are: 1, 5, 6, 7, 8, so as to reflect the larger difference between the normalized performance of logical volume V1 and the normalized performance of the next performing logical volume V3. Any score assignment scheme may be applied. Different logical volumes that may have different actual-to-required performance relationships may be assigned with the same score or a different score.

The sum of all scores is 27 and this value will facilitate in calculating the share of each logical volume in the physical layer queues. Suppose the total allowed pending access requests is 1000, then the allowed pending Access requests for logical volume V1 is: 1000*1/27=37; the allowed pending Access requests for logical volume V2 is: 1000*7/27=259; the allowed pending access requests for logical volume V3 is: 1000*5/27=185; the allowed pending access requests for logical volume V4 is: 1000*6/27=222; and the allowed pending access requests for logical volume V5 is: 1000*8/27=296.

The above example describes an allotment of a fixed number of pending access requests as a function of the normalized performance, however other algorithms may be used for adjusting the allotment using more adaptive manners (for example—using hysteresis, using gradual increments when adjusting the allotment), so as to avoid fluctuations in the normalized performance.

The adjustment of the allotment may further depend (in addition to the normalized performance) on the history related to one or more logical volumes—for example the adjustment may depend on a current allotment, on the number of requests that has been received for the underperforming logical volume within a short time period that preceded the adjustment, and the like. The adjusting of the allotment of an over-performing logical volume may further depend on requirements of underperforming logical volumes.

For example, If an underperforming logical volume has just received Q number of access requests and its current allotment is q, then its new allotment q' may be adjusted: q'=min(Q, q/NP), wherein NP is the Normalized Performance, which is smaller than one for underperforming logical volumes and larger than one for over-performing logical volumes.

That is to say that if Q, the number of received access requests, is larger than the current allotment q, the new allotment q' is increased by a factor that depends on the normalized performance, or otherwise, the current allotment is increased up to the amount of the received access requests (Q) with an upper limit of q/NP that depends on the normalized performance and the current allotment.

If Q, the number of received access requests, is smaller than the current allotment q and the logical volume still underperforms, there is no point (it is not efficient) in increasing the allotment, as it would not be beneficial. Instead, one or more over performing logical volumes may be chosen for reducing their allotment by a certain factor, e.g., by 10%. This reduction may be implemented for all the over performing logical volumes, or the over performing logical volumes may be chosen according to the number of access requests that has been received for them concurrently or within a certain time window that preceded the allotment adjustment. Reducing the total amount of pending access requests can improve the response time of an underperforming logical volume that does not have too much IOPS.

A similar adjustment of the allowed number of pending IO can take place upon detecting a change in the actual-to-required performance relationship of a logical volume.

Upon receiving by the storage system access requests directed to a specific logical volume, the allowed pending access requests on pending access request queues is compared to the currently pending access requests. If the number of currently pending access requests exceeds the allowed pending access requests, then the incoming access requests are withheld and not enqueued on the pending access request queues until the currently pending access requests drops below the allowed pending access requests. Withholding the excess access requests can be done by enqueueing the excess access requests on a postponing queue that differs from the pending access request queues so as to include all requests that exceed the allowed pending access requests of the specific logical volume. The postponing queue is conveniently dedicated to a single logical volume (e.g., the specific logical volume) so that when the pending access request queue of the specific logical volume is alleviated, access requests can be transferred from the postponing queue to the pending access request queue. In case the specific logical volume is an underperforming logical volume, the event of receiving access requests may trigger an adjustment of the allowed pending access requests for the specific logical volume, instead or in addition to the withholding, i.e., part of the excess received access requests may be withheld and part will be allowed and cause adjustment of the allowed pending access requests.

When it is detected that the actual-to-required performance relationship of a logical volume has changed, the allowed pending access requests on pending access request queues for that logical volume is recalculated and changed accordingly, i.e., the allowed pending access requests is increased if the actual-to-required performance relationship is reduced and decreased otherwise, according to the examples described above for calculating the allowed pending access requests.

There is provided a method that may include (i) monitoring actual performance of logical volumes and compare to the required performance (as defined by the SLA) to obtain an actual-to-required performance relation; (ii) calculating an allotment of a number of pending access requests towards the HDDs, per logical volume, based at least on the actual-to-required performance relationship of the logical volume and of the other logical volumes, and optionally, further based on: number of access requests received recently, and the previous allotment of the number of pending access requests; (iii) upon receiving access requests that will cause exceeding of the allowed number of pending access requests of a logical volume—withholding the received access requests until the number of pending access requests of the logical volume is alleviated; and (iv) upon detecting a change in the actual-to-required performance relationship of a logical volume—recalculate the allowed number of pending IO.

Figure 2:
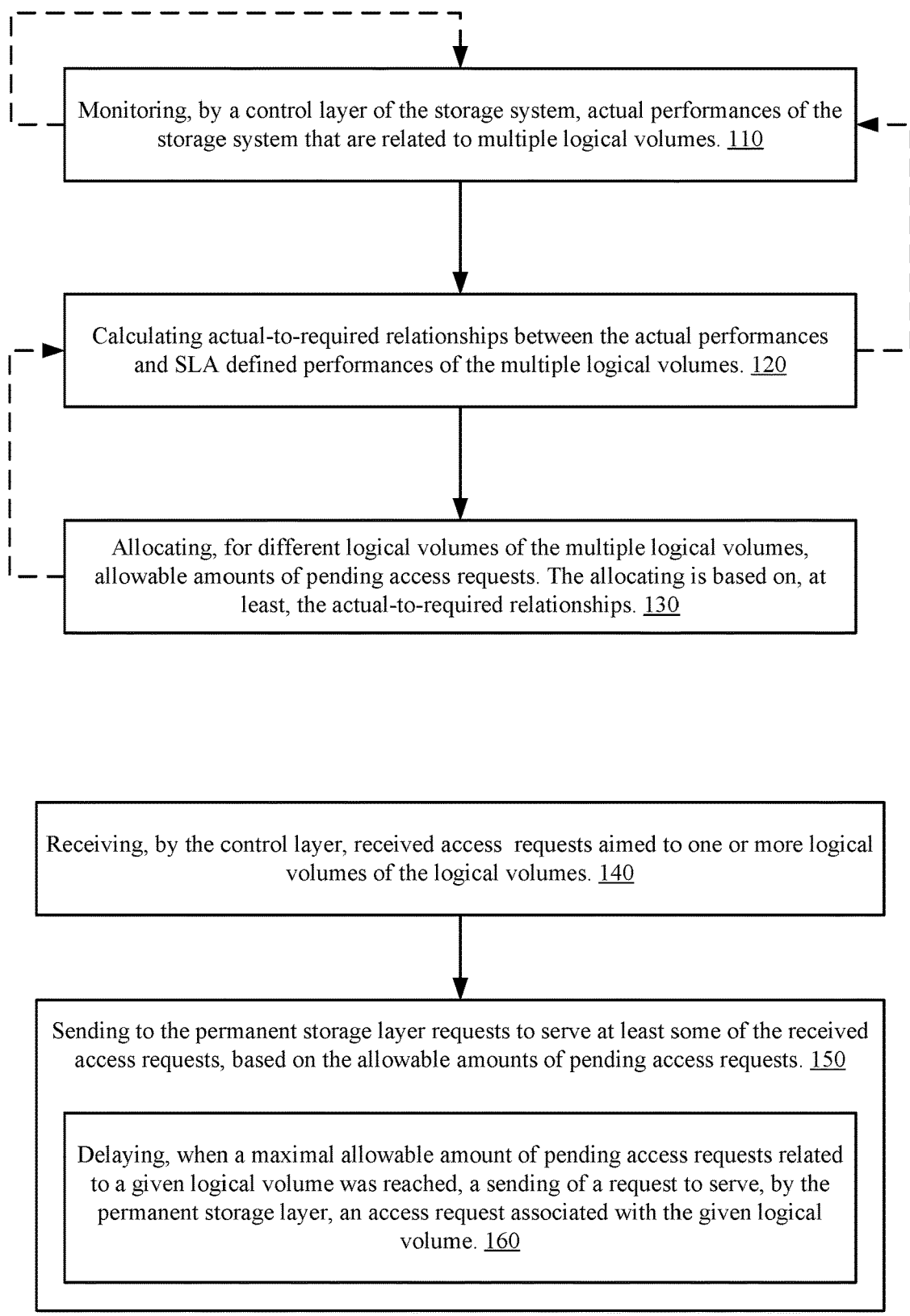
FIG. 2 illustrates a method according to an embodiment of the invention.

FIG. 2 illustrates a method 100 according to an embodiment of the invention.

Method 100 may start by step 110 of monitoring, by a control layer of the storage system, actual performances of the storage system that are related to multiple logical volumes.

The control layer may be prevented from directly defining allocations of resources of the permanent storage layer and method 100 enables the control layer to indirectly affect the allocations of resources of the permanent storage layer.

Step 110 may be executed while one or more other steps of method 100 are executed.

Step 110 may be followed by step 120 of calculating actual-to-required relationships between the actual performances and SLA defined performances of the multiple logical volumes.

The actual-to-required relationship may be determined to one or more logical volumes of the multiple logical volumes. An actual-to-required relationship of a given logical volume may be calculated by applying any formula on the actual performance of the storage system that is related to the given logical volume and an SLA defined performance of the storage system that is related to the given logical volume. Non-limiting example may include a ratio, a difference, and the like.

Step 120 may be followed by step 130 of allocating, for different logical volumes of the multiple logical volumes, allowable amounts of pending access requests. The allocating is based on, at least, the actual-to-required relationships.

Step 130 may be followed by step 110 or by step 120.

Each one of steps 110, 120 and 130 may be executed in a continuous or non-continuous manner. Method 100 may include multiple repetitions of steps 110, 120 and 130.

A change in the one or more actual-to-required relationships may trigger a re-allocation of at least one allowable amount of pending access requests.

Step 130 may include at least one step out of steps 131, 132, 133, 134, 135, 136, 137 and 138. These steps are illustrated in FIG. 3.

Step 131 may include increasing an allowable amount of pending access requests associated with an underperforming logical volume of the multiple logical volumes.

Step 132 may include reducing an amount of pending access requests associated with an over-performing logical volume of the multiple logical volumes.

Step 133 may include allocating the allowable amounts of pending access requests based on the actual-to-required relationships and based on pervious actual performances of the storage system.

The allocating may be responsive, for example, on the actual-to-required relationships and based on amount of access requests received for the volume within a certain time window. For example, a logical volume that received fewer access requests than a given threshold during a time window (duration of seconds, minutes, hours or days) may not be eligible for an increment of the allowable amounts of pending access requests. When the SLA is fulfilled—the number of access requests per time window equals the given threshold.

The allocating may try to find whether there is a relationship between the previously allocated allowable amounts of pending access requests and previous actual performances (actual-to-required-relationships) related to the logical volume. For example—if previous increments of the allocated allowable amounts of pending access requests (above a predefined value) did not improve the actual-to-required-relationships than the assigning may include preventing from allocating more than the predefined value. The allocating may find the best or a sub-optimal assignment that will provide an optimal, maximal or suboptimal of overall actual-to-required-relationships.

Step 134 may include calculating an effectiveness of an increment in an amount of pending access requests associated with a given under-performing logical volume. The effectiveness may be calculated based upon history related to the given under-performing logical volume, such as history of previous allocations, previous increments of allocation, or history of amount of received access requests. If, for example, previous increments of the amount did not increase (by at least a certain amount) the actual-to-required relationship of the given under-performing logical volume or if the amount of received access requests directed to the logical volume is small, so that increasing the amount of pending access requests beyond the amount of expected access requests (based on history of received access requests) is not supposed to improve poor performance, such as high response time, it means that the effectiveness of increasing the amount of pending access requests is below a certain threshold, e.g., the actual performance cannot be increased by more than certain percentages (e.g., 5%). In this case, it may be more beneficial to perform other steps—such as step 135.

Step 135 may include of decreasing an amount of pending access requests associated with at least one over-performing logical volume instead of increasing an amount of pending access requests associated with an under-performing logical volume.

Step 136 may include allocating based on the actual-to-required relationships and based on previously allocated allowable amounts of access requests.

Step 137 may include assigning scores to the multiple logical volumes. The scores are based on the actual-to-required relationships. The allowable amounts of pending access requests are based on the scores.

Step 137 may include assigning higher scores to higher allowable amounts of pending access requests, the higher scores are associated with lower actual-to-required-relationships.

Step 138 may include assigning the allowable amounts of pending access requests based on the scores and on previously allocated allowable amounts of pending access requests. The assigning may try to find whether there is a relationship between the previously allocated allowable amounts of pending access requests and previous performances (actual-to-required-relationships) related to the logical volume. For example—if previous increments of the allocated allowable amounts of pending access requests (above a predefined value) did not improve the actual-to-required-relationships than the assigning may include preventing from allocating more than the predefined value. The assigning may find the best or a sub-optimal assignment that will provide an optimal, maximal or suboptimal of overall actual-to-required-relationships.

Referring back to FIG. 2—method 100 may also include step 140 of receiving, by the control layer, received access requests aimed to one or more logical volumes of the multiple logical volumes.

Step 140 may be followed by step 150 of sending to the permanent storage layer requests to serve at least some of the received access requests, based on the allowable amounts of pending access requests.

Step 150 may include step 160 of delaying, when an allowable amount of pending access requests related to a given logical volume was reached, a sending of a request to serve, by the permanent storage layer, an access request associated with the given logical volume. The delaying may end when the amount of the pending access requests falls below the allowable amount of pending access requests.

The previous text referred to logical volumes but is applicable to any combination or logical address ranges.

Any reference to the terms "comprising", "comprises", "comprise", "including", "include" may also be treated as a reference to "consisting" and/or "consisting essentially of".

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (IO) devices. When executing the computer program, the computer system processes information according to the computer program and produces resultant output information via IO devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for service level agreement allocation of permanent storage layer resources of a storage system, the method comprises:
monitoring, by a control layer of the storage system, actual performances of the storage system that are related to multiple logical volumes;
calculating actual-to-required relationships between the actual performances and service level agreement defined performances of the multiple logical volumes;
allocating, for different logical volumes of the multiple logical volumes, allowable amounts of pending access requests; wherein pending access requests are access requests waiting for response from a permanent storage layer of the storage system; wherein the allocating is based on, at least, the actual-to-required relationships;
receiving, by the control layer, received access requests aimed to one or more logical volumes of the logical volumes; and
sending to the permanent storage layer requests to serve at least some of the received access requests, based on the allowable amounts of pending access requests.

2. The method according to claim 1 comprising delaying, when an allowable amount of pending access requests related to a given logical volume was reached, a sending of a request to serve, by the permanent storage layer, an access request associated with the given logical volume.

3. The method according to claim 1 wherein the allocating comprises increasing an allowable amount of pending access requests associated with an underperforming logical volume of the multiple logical volumes.

4. The method according to claim 1 wherein the allocating comprises reducing an allowable amount of pending access requests associated with an over-performing logical volume of the multiple logical volumes.

5. The method according to claim 1 wherein the allocating is also based on pervious actual performances of the storage system related to the multiple logical volumes.

6. The method according to claim 1, comprising calculating an effectiveness of an increment in an amount of pending access requests associated with a given under-performing logical volume.

7. The method according to claim 6 wherein the calculating of the effectiveness is based upon history related to the given under-performing logical volume.

8. The method according to claim 1 wherein the allocating is also based on previously allocated allowable amounts of access requests.

9. The method according to claim 1 wherein the calculating of the allowable amounts of pending access requests comprises assigning scores to the multiple logical volumes scores; wherein the scores are based on the actual-to-required relationships; and wherein the allowable amounts of pending access requests are based on the scores.

10. The method according to claim 9 wherein the allowable amounts of pending access requests are based on the scores and on previously allocated allowable amounts of pending access requests.

11. The method according to claim 1, comprising re-allocating at least one allowable amount of pending access requests when one or more actual-to-required relationship has changed.

12. The method according to claim 1 wherein the control layer is prevented from directly defining resource allocations of resources of the permanent storage layer.

13. The method according to claim 1 wherein an actual-to-required relationship of a given logical volume is a ratio between an actual performance of the storage system that is related to the given logical volume and an SLA defined performance of the storage system that is related to the given logical volume.

14. The method according to claim 1, comprising calculating an effectiveness of an increment in an amount of pending access requests associated with a given under-performing logical volume; wherein the allocating comprises decreasing an allowable amount of pending access requests associated with an over-performing logical volume instead of increasing an allowable amount of pending access requests associated with the given under-performing logical volume.

15. A storage system comprising a control layer and a permanent storage layer; wherein the control layer is configured to monitor actual performances of the storage system that are related to multiple logical volumes; calculate actual-to-required relationships between the actual performances and service level agreement defined performances of the multiple logical volumes; allocate, for different logical volumes of the multiple logical volumes, allowable amounts of pending access requests; wherein pending access requests are access waiting for response from the permanent storage layer of the storage system; wherein the allocating is based on, at least, the actual-to-required relationships; receive received access requests aimed to one or more logical volumes of the logical volumes; and (e) send to the permanent storage layer requests to serve at least some of the received access requests, based on the allowable amounts of pending access requests.

16. A non-transitory computer readable medium that stores instructions that once executed by a control layer of a storage system, causes the control layer to execute the steps of: monitoring, by a control layer of the storage system, actual performances of the storage system that are related to multiple logical volumes; calculating actual-to-required relationships between the actual performances and service level agreement defined performances of the multiple logical volumes; allocating, for different logical volumes of the multiple logical volumes, allowable amounts of pending access requests; wherein pending access requests are access requests waiting for response from the permanent storage layer of the storage system; wherein the allocating is based on, at least, the actual-to-required relationships; receiving, by the control layer, received access requests aimed to one or more logical volumes of the logical volumes; and sending to the permanent storage layer requests to serve at least some of the received access requests, based on the allowable amounts of pending access requests.

* * * * *